(12) United States Patent
Dewan et al.

(10) Patent No.: US 9,525,555 B2
(45) Date of Patent: Dec. 20, 2016

(54) PARTITIONING ACCESS TO SYSTEM RESOURCES

(71) Applicant: Intel Corporation, Santa Clara, CA (US)

(72) Inventors: Prashant Dewan, Hillsboro, OR (US); Kapil Sood, Beaverton, OR (US); Kumar N. Dwarakanath, Folsom, CA (US); Ioannis T. Schoinas, Portland, OR (US); William A. Stevens, Jr., Folsom, CA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 14/574,969

(22) Filed: Dec. 18, 2014

(65) Prior Publication Data
US 2016/0182238 A1 Jun. 23, 2016

(51) Int. Cl.
*H04L 29/06* (2006.01)
*H04L 9/32* (2006.01)
*G06F 12/14* (2006.01)

(52) U.S. Cl.
CPC .......... *H04L 9/3263* (2013.01); *G06F 12/1408* (2013.01); *H04L 9/321* (2013.01); *H04L 9/3234* (2013.01); *H04L 9/3242* (2013.01); *G06F 2212/1052* (2013.01)

(58) Field of Classification Search
CPC .................................................... H04L 9/3263
See application file for complete search history.

(56) References Cited

U.S. PATENT DOCUMENTS

| | | | | |
|---|---|---|---|---|
| 6,609,199 B1* | 8/2003 | DeTreville | ............ | G06F 9/4406 713/156 |
| 7,831,997 B2* | 11/2010 | Eldar | ...................... | H04L 63/08 713/156 |
| 2007/0162964 A1* | 7/2007 | Wang | ...................... | G06F 21/77 726/5 |
| 2007/0297396 A1* | 12/2007 | Eldar | ...................... | H04L 63/08 370/356 |
| 2008/0184072 A1* | 7/2008 | Odlivak | .............. | G06F 11/3644 714/32 |

(Continued)

OTHER PUBLICATIONS

Regenscheid, Andrew. "Roots of Trust in Mobile Devices" ISPAB. Feb. 2012.*

(Continued)

*Primary Examiner* — Shawnchoy Rahman
(74) *Attorney, Agent, or Firm* — Trop, Pruner & Hu, P.C.

(57) ABSTRACT

In one embodiment, a processor has at least one core to execute instructions, a security engine coupled to the at least one core, a first storage to store a first immutable key associated with a vendor of the processor, and a second storage to store a second immutable key associated with an original equipment manufacturer (OEM) of the system. A first portion of firmware is to be verified based at least in part on the first immutable key and a second portion of firmware is to be verified based at least in part on the second immutable key, the first portion of firmware associated with the vendor and the second portion of firmware associated with the OEM. Other embodiments are described and claimed.

18 Claims, 13 Drawing Sheets

(56) References Cited

U.S. PATENT DOCUMENTS

| | | | |
|---|---|---|---|
| 2014/0195807 A1* | 7/2014 | Bar-El | H04L 9/0877 |
| | | | 713/168 |
| 2014/0331064 A1* | 11/2014 | Ballesteros | G06F 12/1408 |
| | | | 713/193 |
| 2015/0264040 A1* | 9/2015 | Schneider | H04L 9/3265 |
| | | | 726/10 |

OTHER PUBLICATIONS

Saleh, Resve, et al. "System-on-chip: reuse and integration." Proceedings of the IEEE 94.6 (2006): 1050-1069.*
Xu, Lei, and Weidong Shi. "Removing the root of trust: Secure oblivious key establishment for FPGAs." 2014 IEEE Computer Society Annual Symposium on VLSI. IEEE, 2014.*
U.S. Appl. No. 14/493,613, filed Sep. 23, 2014, entitled "Performing Pairing and Authentication Using Motion Information," by Ned M. Smith, et al.
Intel Corporation, "Deeper Levels of Security with Intel Identify Protection Technology," 2012, 9 pages.
U.S. Appl. No. 14/472,645, filed Aug. 29, 2014, entitled "Pairing Computing Devices According to a Multi-Level Security Protocol," by Abhilasha Bhargav-Spantzel, et al.
U.S. Appl. No. 14/493,621, filed Sep. 23, 2014, entitled "Securely Pairing Computing Devices," by Avi Priev, et al.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.

* cited by examiner

PARTITIONING ACCESS TO SYSTEM RESOURCES

TECHNICAL FIELD

Embodiments relate to computing devices and more particularly to enhancing security of assets in such devices.

BACKGROUND

Some modern processors are implemented as a system on chip (SoC) that includes a variety of circuitry and other logic. In some cases, these SoCs can include multiple semiconductor intellectual property cores (also referred to as an IP core or IP block). An IP block is a reusable unit of logic. For some SoCs, one or more of the IP blocks may be developed by different providers, and a final SoC design and resulting product can include IP blocks originating from different vendors.

In addition, a mass produced SoC can be sold to multiple original equipment manufacturers (OEMs), which implement the SoC into a variety of different end user platforms. Given the multiple different parties that have access to an SoC and platform, it becomes difficult to protect various assets such as IP blocks, firmware and so forth from unauthorized access.

DETAILED DESCRIPTION

Figure 1:
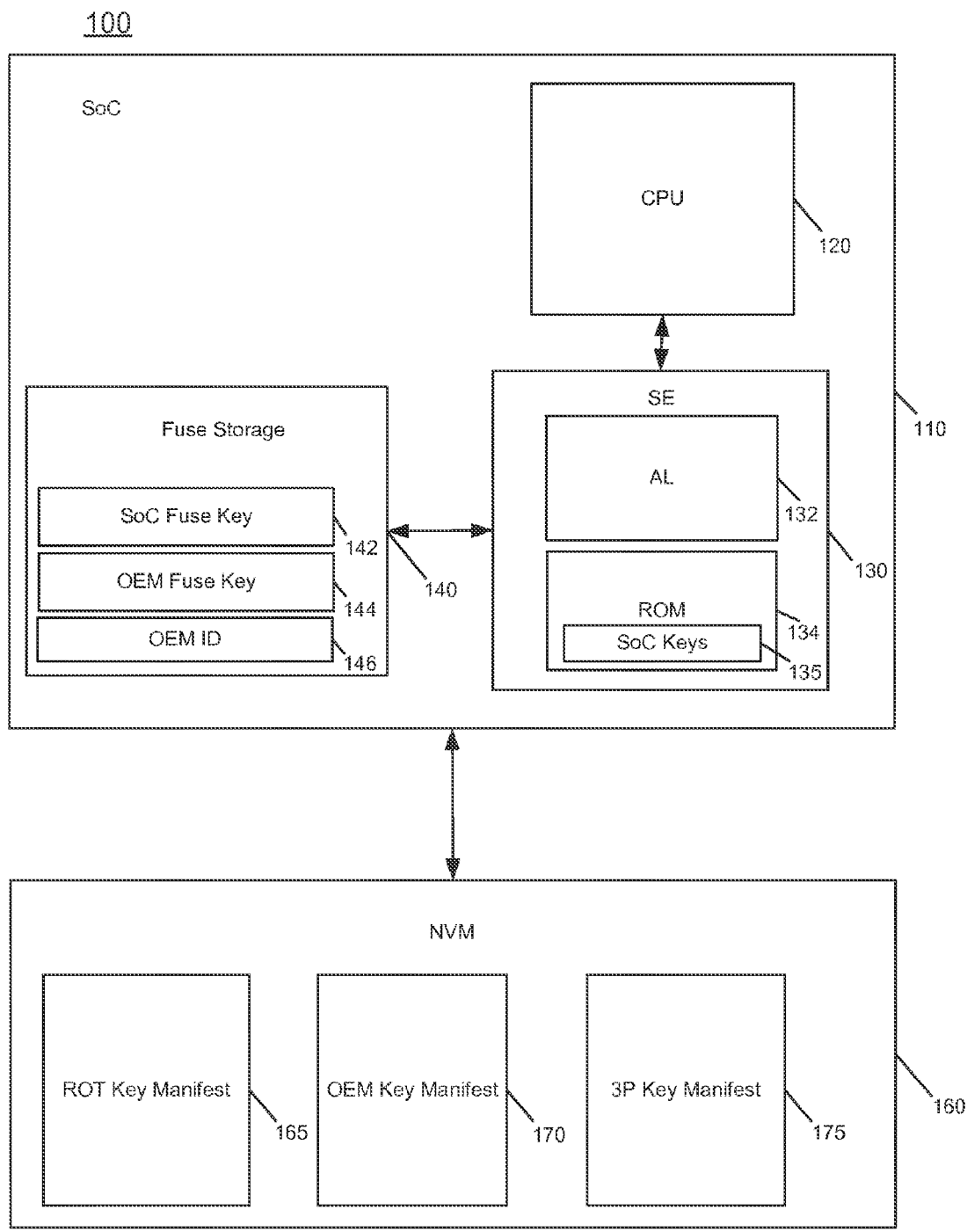
FIG. 1 is a block diagram of a portion of a system in accordance with an embodiment of the present invention.

Embodiments partition platform firmware into multiple portions, which in an embodiment can include a SoC vendor-owned portion and an OEM-owned portion (each of which can include sub-portions). Understand that a given platform may include a firmware having potentially greater numbers of independent and segregated firmware portions. The first portion, also referred to as SoC vendor firmware, is owned by the SoC vendor and is the first piece of software to execute after a platform including the SoC is reset. When the platform comes out of reset, the SoC firmware (that has previously been signed by the SoC vendor) is verified and executed. The SoC firmware is verified and authorized by information stored in the SoC. The SoC firmware, in execution, is configured to ensure that all platform assets that should not be visible to third parties (including an OEM) have been locked and hidden from the OEM firmware. Note that in different use cases, many different types of assets can be protected based on the SoC applications and target markets. Examples include, but are not limited to, SoC specific root provisioned keys, private keys/data stored in fuses or other non-volatile storage, access control of IP-sensitive SoC registers, device specific keys, private keys for disk encryption and secure non-volatile memory storage of sensitive data, private keys for protecting digital rights management (DRM) content, among others.

In turn, the SoC firmware subsequently hands over authority and control to a second portion of firmware, also referred to herein as OEM firmware, which is executed to enable the platform to enter into an operating system (OS) boot. In an embodiment, the OEM firmware is owned by the OEM and, during execution, does not have access to any of the platform assets that the SoC vendor seeks to keep protected from other entities.

After the SoC firmware has executed, control and authority may be transferred to the OEM firmware in part via a manifest, referred to herein as a root of trust (RoT) manifest. In an embodiment, this manifest is signed by the OEM with a key pair embedded in the platform at the time of manufacture. In some cases, this manifest may further include other OEM-supplied keys. In the transition from the SoC firmware to the OEM firmware, the SoC firmware verifies the manifest and transfers the RoT from the SoC keys to the OEM keys in the manifest. Subsequently, the RoT manifest provides a verification root key for all subsequent firmware loads.

Embodiments thus provide a clean and secure approach of separating firmware and responsibilities between OEM and SoC vendor (and, by extension to original device manufacturers (ODM) and suppliers). Each entity associated with a platform incorporating an SoC as described herein may be associated with its own separate security credentials. Moreover, embodiments decouple the OEM and the SoC vendor's trust dependency once the platform has left the SoC vendor's manufacturing facility. Similarly, this decouples the ODM and suppliers who can securely develop/debug the platform in pre-production phase from the OEM/customer after production. As such, the SoC vendor's assets may be protected while giving freedom of innovation to the OEM. Still further, in some cases multiple IP block suppliers can to contribute to an SoC design without security concerns. Understand that the terms "SoC vendor" and "OEM" are used broadly and can include various entities. With regard to a SoC or other processor vendor, understand that this vendor may be both a designer of all or portions of the SoC and also its manufacturer. In other cases, the vendor may be a designer of all or portions of the SoC and instead delegate manufacture of the SoC to another entity such as a semiconductor foundry. In yet further cases, the SoC vendor may be a licensor that designs IP logics that can be incorporated into a final SoC designed by another entity, which either manufactures or has manufactured the SoCs. In turn, the OEM may be an actual manufacturer of end user systems or other platforms, or may delegate some or all of the manufacturing to one or more entities.

Embodiments may also enable an entity, e.g., an OEM to refurbish a platform, including re-flashing of keying material/manifests without affecting the IP blocks in the SoC. Thus in contrast to a security system that only provides for manufacture-time only provisioning of RoT which cannot be changed, embodiments allow multiple secure RoTs and dynamic delegation of RoT after production. Such RoT secure delegation can be used in technology areas like network function virtualization (NFV) and software defined networks (SDN), where operators can delegate a platform to other operators or service providers (e.g., an ATT platform running another operator's firmware). Also, a single stock keeping unit (SKU) (from the SoC provider view) can be scalable across multiple OEMs, each with a separate RoT. By extension, the scalability advantage is extended to these OEMs by using their same SKU and secure sub-SKUing to their various customers Embodiments thus provide a SoC or other hardware device that provides for multi-tenancy in hardware, in that at least certain logic or other components present in the SoC may be derived from one or more different vendors. To enable such diverse resources (e.g., assets of different entities) to interact appropriately while securely protecting the resources from unauthorized access, embodiments may derive trust assertions that extend from the manufacturing phase of the SoC. Thus in some embodiments, instead of providing a root of trust for hardware of a processor that all originates from a single vendor (such as a trusted platform module (TPM) of a processor where all resources are provided by a single vendor), a multi-tenant root of trust is realized in which protected assets of multiple entities can be securely measured and accessed responsive to an authentication protocol as described herein.

Referring now to FIG. 1, shown is a block diagram of a portion of a system in accordance with an embodiment of the present invention. As shown in FIG. 1, system 100 includes a SoC 110 coupled to a non-volatile storage 160. In different implementations, SoC 110 may be a multicore processor having multiple homogeneous or heterogeneous cores in a central processing unit (CPU) domain 120. SoC 110 includes additional circuitry, specialized function units, interfaces, uncore areas and so forth (not shown for ease of illustration in FIG. 1). In addition, SoC 110 includes a security engine 130. In different embodiments, security engine 130 may be implemented as a separate processing core, a co-processor, programmed logic or so forth.

In the embodiment shown, security engine 130 includes an authentication logic 132, which as described herein may be configured to perform various verification/authentication operations. In addition, security engine 130 includes a read-only memory (ROM) 134 which may be written during manufacture of the SoC. ROM 134 may include various keys written during the manufacture process to be used for various platform verification/authentication processes. In the embodiment shown, ROM 134 includes one or more SoC keys 135, which may be cryptographic keys associated with the SoC vendor. In a particular embodiment, one SoC key 135, referred to herein as a ROM key, is a public hash key such as a 256-bit Rivest Shamir Adleman (RSA) hash key that is immutable and is associated with the SoC vendor, e.g., a public key of the SoC vendor. As will be described herein, SoC key 135 may be configured to sign an initial firmware portion of the SoC vendor. Thus SoC key 135 can be used to verify the SoC vendor early boot firmware(s). In an embodiment this SoC key can also be used to sign a first manifest containing IP block whitelist hash values. Note that ROM 134 may store more than one key, and in some embodiments, these keys may be utilized for various scenarios, including keys for enabling debug at a customer site, keys for enabling pre-production validation at an OEM site or at the SoC vendor site, keys used for creating additional specific SKUs, among others.

As further illustrated in FIG. 1, SoC 110 further includes a fuse storage 140, which may be another non-volatile storage that is written (e.g., fused by blowing various fuse elements) during a manufacturing process. Fuse storage 140 may store various information, some of which is associated with configuration information for the SoC. Additional information to be stored in fuse storage relates to a variety of keys, identifiers and so forth to be used in connection with verification and authentication operations as described herein. Thus as shown in FIG. 1, fuse storage 140 includes an SoC fuse key 142, an OEM fuse key 144, and an OEM-ID 146. OEM fuse key 144, referred to herein as a fuse key, is used to sign the RoT manifest. Note that this key is owned by the OEM but is blown by the SoC provider during manufacture. In some cases, the OEM may generate and communicate this key to the SoC vendor but in other cases, e.g., based on OEM requirements, costs structure, and/or business contract, the SoC vendor may provision the key. In addition, an OEM identifier (OEM-ID) may be implemented as a set of fuses that are blown by the SoC provider during manufacturing. This OEM-ID also associates a platform with a RoT manifest such that the manifest meant for one platform cannot be used by another platform. Note that there may be multiple OEM-IDs for a given OEM for a particular SoC SKU (of the SoC vendor) such that an OEM can sub-SKU this SoC for different target markets, e.g., one OEM-ID for government, another for a specific financial institution, etc. Understand while shown with these limited keys and identifiers, many other keys, identifiers and so forth may also be implemented within fuse storage 140.

Still with reference to FIG. 1, a non-volatile memory 160 may be a flash or other non-volatile storage that is implemented on a motherboard along with SoC 110 (and other system components). In embodiments described herein, non-volatile memory 160 may store at least portions of system firmware. In addition, non-volatile memory 160 may store a plurality of manifests to be used during verification operations as described herein. In the embodiment shown, non-volatile memory 160 includes a RoT key manifest 165, an OEM key manifest 170, and a third party key manifest 175. In various embodiments, these key manifests may be stored in a secure portion of the non-volatile memory, such that they can be only accessed while the platform is in a trusted execution environment (TEE). For example, this TEE may be implemented using Intel® SGX technology, Intel® TXT technology, or an ARM TrustZone. To this end, implementations may include various hardware, both general-purpose and specialized security hardware, to create a TEE and perform secure operations, including the firmware and other validations described herein. Understand while shown with this limited number of manifests in FIG. 1, additional or different manifests, including additional key or other manifests may be present in other embodiments.

Figure 2:
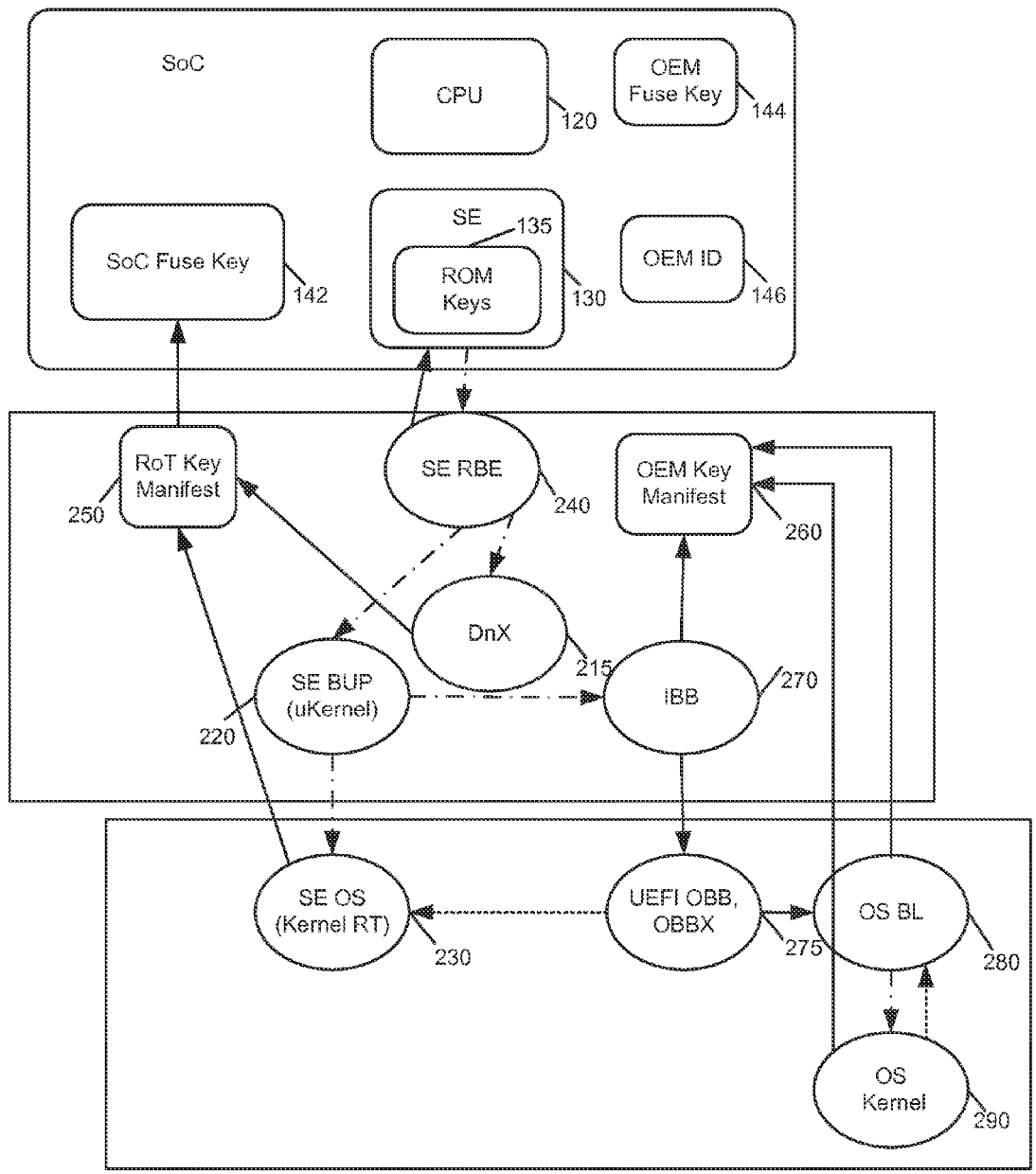
FIG. 2 is a block diagram illustrating a verification flow in accordance with an embodiment of the present invention.

Referring now to FIG. 2, shown is a block diagram illustrating a verification flow in accordance with an embodiment of the present invention. In the illustration of FIG. 2, various entities may interact to verify an SoC and its environment, e.g., on power up or reset of a platform including the SoC. Generally, this verification may proceed through various steps or phases in which SoC vendor-controlled assets take control and verify a first portion of firmware associated with the SoC vendor. Thereafter, and assuming successful verification and execution of this firmware portion, a second portion of the firmware associated with the OEM may be verified and control passes off to this firmware portion, which in turn may execute and then verify OS components to enable boot up of the OS and entry into normal platform operation. In FIG. 2, the solid lines indicate key authorization procedures, the long dashed lines indicate authentication flows, while the dash/dotted lines indicate a trust chain (i.e., a root of trust).

In the embodiment of FIG. 2, to begin boot up processes, a first portion of firmware, referred to as a run boot extension (RBX) 210 may be signed by SoC key 135. Upon verification and execution of this firmware portion, a download and execute (DnX) code segment 215 and a microkernel 220 may be loaded and verified, e.g., using keys in a RoT key manifest 250 (which in an embodiment may be obtained from non-volatile storage 160 of FIG. 1). Such DnX segment 215 allows for reflash of a part in certain scenarios, e.g., where the on-storage image is corrupted and/or SoC platform is not booting. Or, when a store customer agent wants to download a specific software/firmware onto a customer device, etc. Upon successful execution here, a kernel runtime 230 is then loaded and verified, e.g. again with reference to one or more keys in RoT key manifest 250. At this point, various code segments verified by SE 130 have been loaded and executed, and control next passes to loading, verification and execution of additional firmware (under control of the OEM), and thereafter to the OS.

Thus as further illustrated in FIG. 2, an initial boot block (IBB) 270 may be loaded and verified, e.g., with reference to one or more keys in an OEM key manifest 260 (which may be obtained from a non-volatile storage such as non-volatile memory 160 of FIG. 1). Thereafter, a unified extensible firmware interface (UEFI) OS boot block 275 may be authenticated and executed, and thereafter control passes to a boot loader 280, which responsive to authentication causes a loading of an OS kernel 290 which, when authenticated can be executed to begin normal system operation. Understand while shown at this high level in FIG. 2, many variations and alternatives are possible.

Figure 3:
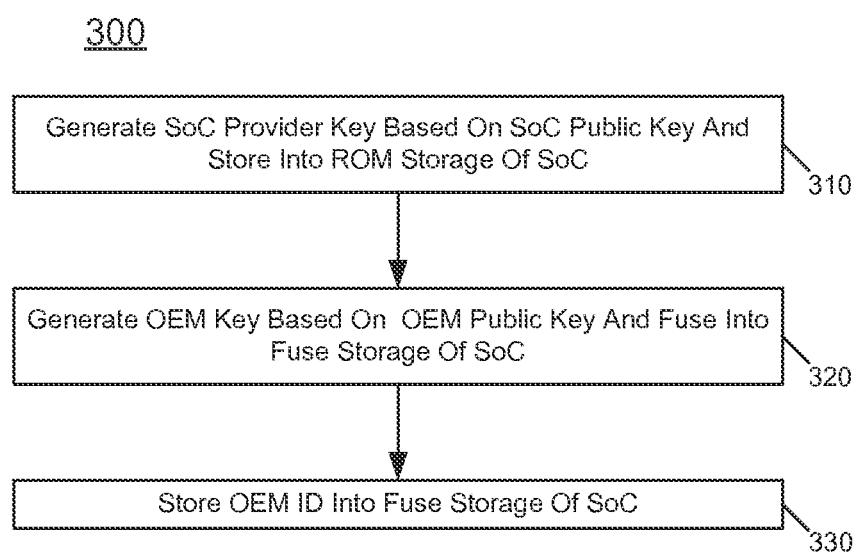
FIG. 3 is a flow diagram of a method for storing key material in accordance with an embodiment of the present invention.

Referring now to FIG. 3, shown is a flow diagram of a method for storing key material in accordance with an embodiment of the present invention. In the embodiment of FIG. 3, method 300 may be performed during a manufacturing process, such as performed by an SoC vendor during mass production operations to manufacture a set of SoC's, using various semiconductor manufacturing processes. To this end, a set of masks are generated and used to pattern and define semiconductor wafers that in turn can then be separated or diced into individual die, each of which can be packaged into an individual SoC.

In the embodiment of FIG. 3, method 300 begins by generating an SoC provider key (block 310). As an example, SoC provider key can be based on a public key of the SoC vendor. This key can be stored into a ROM of the SoC, which may be present within a security engine of the SoC.

Next, at block 320 an OEM key may be generated based on an OEM public key. This OEM key may be fused into the SoC during manufacturing operations, e.g., by blowing a set of fuses to represent the OEM key. Thereafter, control passes to block 330 where an OEM-ID also may be stored in such fuse storage. In an embodiment, the OEM public key is generated by the OEM and the OEM securely stores the private key of the public-private key pair. The OEM public key is used for verifying the cryptographic signatures performed by the OEM using the corresponding private key. The OEM-ID is a string that identifies a specific SoC part with an OEM or an OEM SKU. Thus at the conclusion of method 300, various keys and other identifiers, both of the SoC vendor and an OEM have been permanently stored within a manufactured SoC. This SoC can in turn be provided to the OEM. Understand of course that in the manufacture of a given SoC, many other operations and processes are performed to result in a finished product completed SoC.

Figure 4:
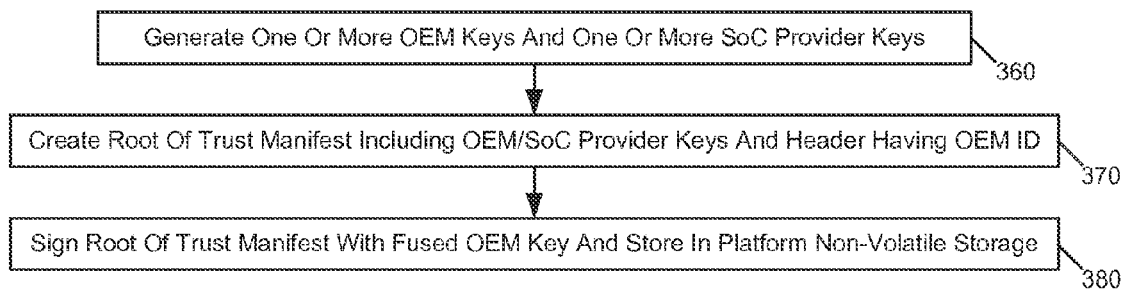
FIG. 4 is a flow diagram of a method for generating a RoT key manifest in accordance with an embodiment.

Referring now to FIG. 4, shown is a flow diagram of a method for generating a RoT key manifest in accordance with an embodiment. More specifically, this key manifest may be created and stored into a non-volatile memory, such as a flash device that includes at least portions of the platform firmware. Although the scope of the present invention is not limited this regard, in an embodiment, method 350 may be performed by an OEM during a manufacture process for a platform including an SoC as described herein.

As seen, FIG. 4 begins by generating one or more OEM keys and one or more SoC provider keys (block 360). Note here that a variety of different keys may be generated, including keys of the SoC provider (which may be signed by the OEM fuse key), such as an SoC vendor's business unit (BU)-driven OEM SKU-based keys. This is so, as different BUs may want to target the SoC or SoC derivative into different markets or pricing segments. Next, control passes to block 370 where a RoT manifest may be created. More specifically, this RoT manifest may include the above-described keys and additionally a header. Note that the header may include the OEM-ID. Although the scope of the present invention is not limited in this regard, this RoT key manifest may include 16 RoT keys. Details of a particular manifest are described further below. Control next passes to block 380 where the RoT manifest may be signed with the fused OEM key and stored in an appropriate storage (e.g., a flash memory including firmware). Understand while shown at this high level in FIG. 4, many variations and alternatives are possible.

Figure 5:
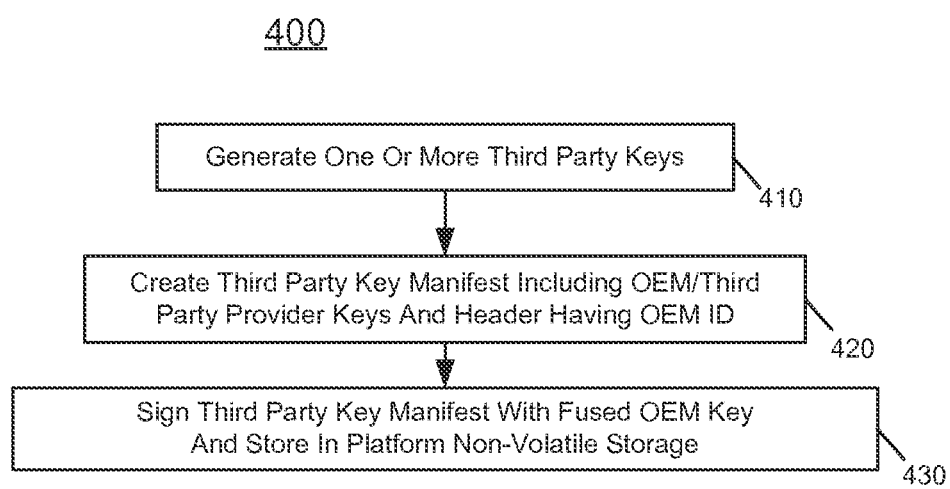
FIG. 5 is a flow diagram of a method for generating a third party key manifest in accordance with an embodiment.

Referring now to FIG. 5, shown is a flow diagram of a method for generating a third party key manifest in accordance with an embodiment. As above, this key manifest may be created and stored into the same non-volatile memory as other manifests. In different cases, an OEM may generate this third party manifest during a manufacture process for a platform including an SoC as described herein, e.g., for a given customer such as a service provider or other large enterprise. In other cases, the OEM may delegate entities to generate and store third party key manifests.

As seen, FIG. 5 begins by generating one or more third party keys (block 410). Note here that a variety of different keys may be generated, including keys that may be used for an OEM or any of the OEM partners, for use by an Original Device Manufacturer (ODM) during manufacturing and validation, including both OEM and third party keys. Next, control passes to block 420 where a key manifest may be created. More specifically, this key manifest may include the above-described keys and additionally a header. Note that the header may include the OEM-ID. Control next passes to block 430 where the key manifest may be signed with the fused OEM key and stored in an appropriate storage (e.g., a flash memory including firmware). Understand while shown at this high level in FIG. 5, many variations and alternatives are possible.

When a platform in accordance with an embodiment boots, boot code in the ROM is executed. This boot code loads a first portion of firmware that is owned by the SoC provider. This firmware is loaded in memory and verified using one of the SoC provider keys. Subsequently, this firmware loads the fuse key. Thereafter, the firmware loads the RoT manifest and authenticates the manifest using the fuse key. Once the manifest is authenticated, the firmware loads the second portion of firmware (the OEM firmware) and searches the authenticated RoT manifest for the first available key that in the manifest that can be used for verifying the OEM firmware.

As an example with reference back to FIG. 2, this can be done by associating an Image-Type with a specific key, for example assign an image-type "5" for the OS boot loader 280, or using the same Image-Type with one or more software/firmware components, for example, using image type "5" for OS boot loader 280 and also for OS kernel 290. Other mechanisms can also be used, for example, assigning fixed key locations for an image type.

Still with reference to FIG. 5, thereafter, the firmware compares the hash of the key in the manifest with the hash of the key in the firmware header. If these values match, the OEM firmware is verified and control may pass to this portion of the firmware for execution. If the hashes do not match, the firmware searches for the next available key in the manifest. If no appropriate key is found, a recovery process may be initiated. After repeated failures, e.g., more than three, failure reporting may occur depending on the device, such as a flashing red light on a phone or a buzz on a wristband wearable, or a text screen for a tablet, etc. Once the OEM firmware is verified, the control is passed to the OEM firmware. The OEM firmware can now, load component or device level firmware and verify them using one or more keys in the manifest, or another manifest in cases where an OEM creates multiple manifests.

Figure 6:
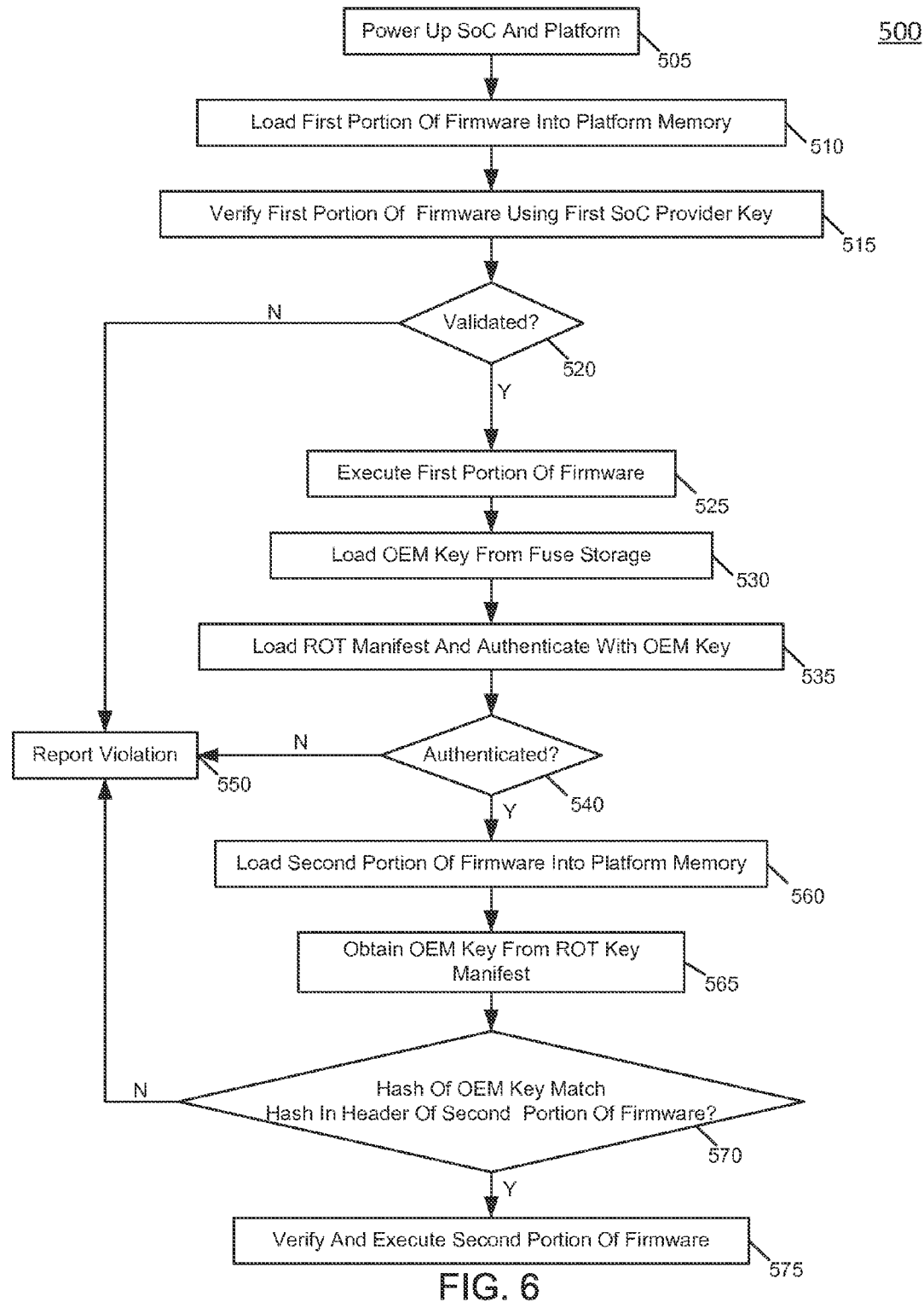
FIG. 6 is a flow diagram of a method of operation of a platform including SoC in accordance with an embodiment.

Referring now to FIG. 6, shown is a flow diagram of a method of operation of a platform including SoC in accordance with an embodiment. More specifically, method 500 may execute on reset or power up of the platform including the SoC. As seen, method 500 begins by powering up the SoC and platform (block 505). For example, a user may power up a platform, such as a smartphone or other portable (or non-portable) computing device including the SoC. Thereafter, after initial reset operations by the SoC, control passes to block 510 where a first portion of the firmware may be loaded into platform memory, which in an embodiment may be a DRAM or other such system memory. This first portion of firmware may be of the SoC vendor and can be maintained in a protected manner such that neither the OEM nor any other third party has access to this firmware. As such, this first portion of firmware may be used for purposes of booting up and initializing assets of the SoC to be protected from third party interaction.

Still referring to FIG. 6, control next passes to block 515 where this first portion of firmware may be verified. In an embodiment, a first SoC provider key, e.g., present in a ROM storage (namely an SoC provider ROM key), may be used for purposes of this verification. Next, at diamond 520 it is determined whether this first portion of firmware is validated. If so, control passes to block 525 where this first portion of firmware may be executed. Otherwise, a violation may be reported, at block 550.

Still with reference to FIG. 6, during execution of this first portion of firmware, control passes to block 530 where an OEM key may be loaded. More specifically, an OEM fuse key present in a fuse storage of the SoC may be loaded. Thereafter, control passes to block 535 where a RoT manifest can be loaded. This RoT manifest may be stored in appropriate non-volatile storage of the platform. Also at block 545, this RoT manifest can be authenticated using the OEM key. Control next passes to diamond 540 to determine whether the RoT manifest is authenticated. If so, control passes to block 560 where a second portion of the platform firmware can be loaded into a platform memory. Note that if the RoT manifest is not authenticated, control passes to block 550 for reporting of a violation.

Still with reference to FIG. 6, after loading the second portion of firmware, control passes to block 565, where an OEM key can be obtained. More specifically, this OEM key may be obtained from the RoT key manifest. Next, control passes to diamond 570 to determine whether a hash of the OEM key matches a hash in a header of the second portion of the firmware. If so, the second portion of firmware is verified, and control passes to block 575 where this firmware can be executed. Understand that after this execution, additional boot operations to enter into an OS environment can occur. Otherwise if at diamond 570 it is determined that the hashes do not match, control passes back to block 550 discussed above. Understand while shown at this high level in the embodiment of FIG. 6, many variations and alternatives are possible.

Figure 7:
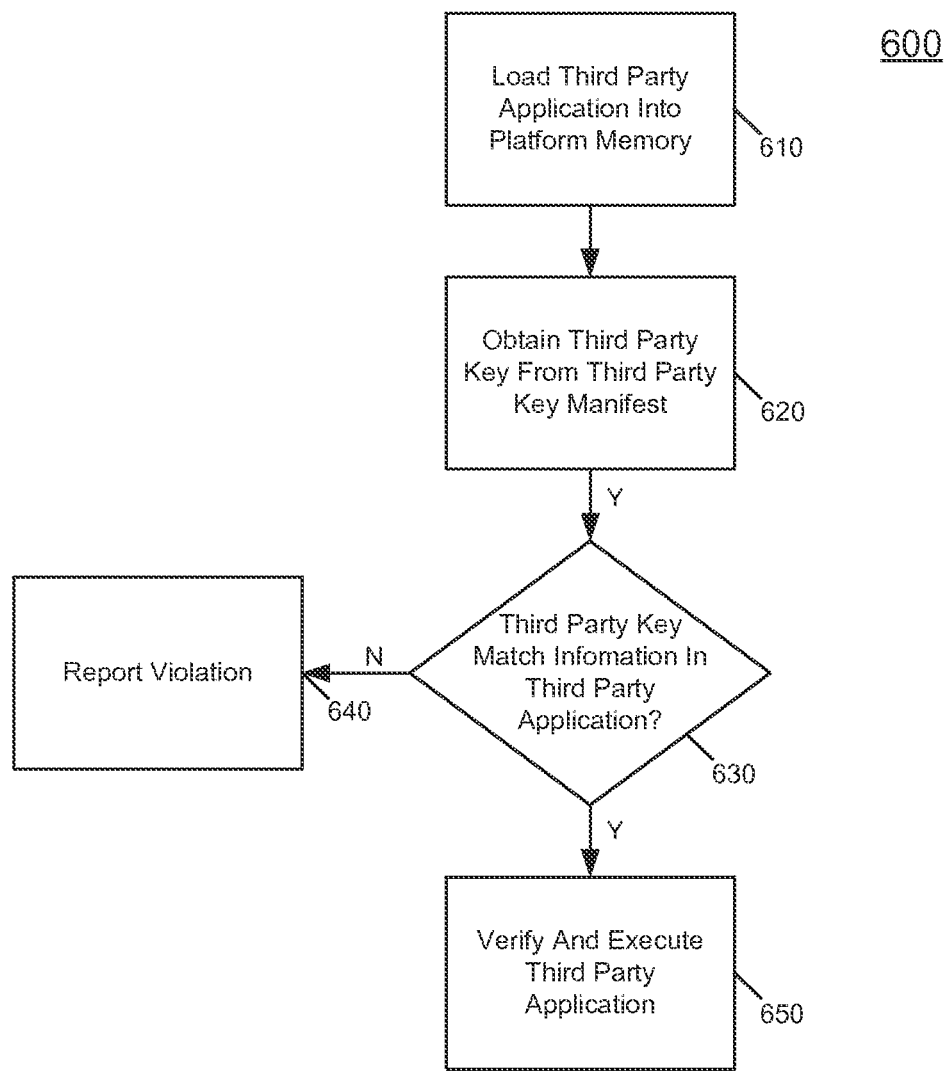
FIG. 7 is a flow diagram of a method for verifying a third party application in accordance with another embodiment of the present invention.

Thus at this point, assuming successful execution the platform can enter into a normal boot environment and perform desired operations. Understand that in some cases, additional root of trust processes may be performed to enable third party applications, such as applications of a service provider that provisions the platform for end users, to be validated and executed. Referring now to FIG. 7, shown is a flow diagram of a method for verifying a third party application in accordance with another embodiment of the present invention. In the embodiment of FIG. 7, method 600 may be used to verify and authenticate a third party application using the root of trust techniques described herein. As seen, method 600 begins by loading a third party application into a platform memory (block 610). Assume for purposes of discussion that this third party application is a given application of a service provider to enable the service provider's end user customers to access certain services associated with a particular level of service (e.g. as determined by a sub-SKU associated with the platform (and thus also associated with a sub-SKU of the SoC included in the platform). Control next passes to block 620 where a third party key may be obtained from a third party key manifest. Note that this third party key manifest may be provisioned into the platform by the OEM in sub-SKUing operations. However in other embodiments understand that this provisioning instead may be performed by the third party operator itself. In either case, control next passes to diamond 630 to determine whether this third party key matches information in the third party application. For example, the application may include a header portion that has a key to associate with this third party key stored in the key manifest. If the keys match, control passes to block 650 where the application may thus be verified and executed. Otherwise, a violation may be reported at block 640. Understand while shown at this high level, many variations and alternatives are possible.

In an embodiment, the RoT manifest is a data structure containing additional OEM/SoC vendor keys (in addition to the above-described keys) and a header having the OEM-ID. This manifest may be signed by the fuse key. During OEM configuration of a platform, the OEM can include or associate various keys in the manifest and use them to verify the signature of different firmware components or other software constructions. In one example, the RoT manifest contains OEM-supplied whitelist images.

Figure 8:
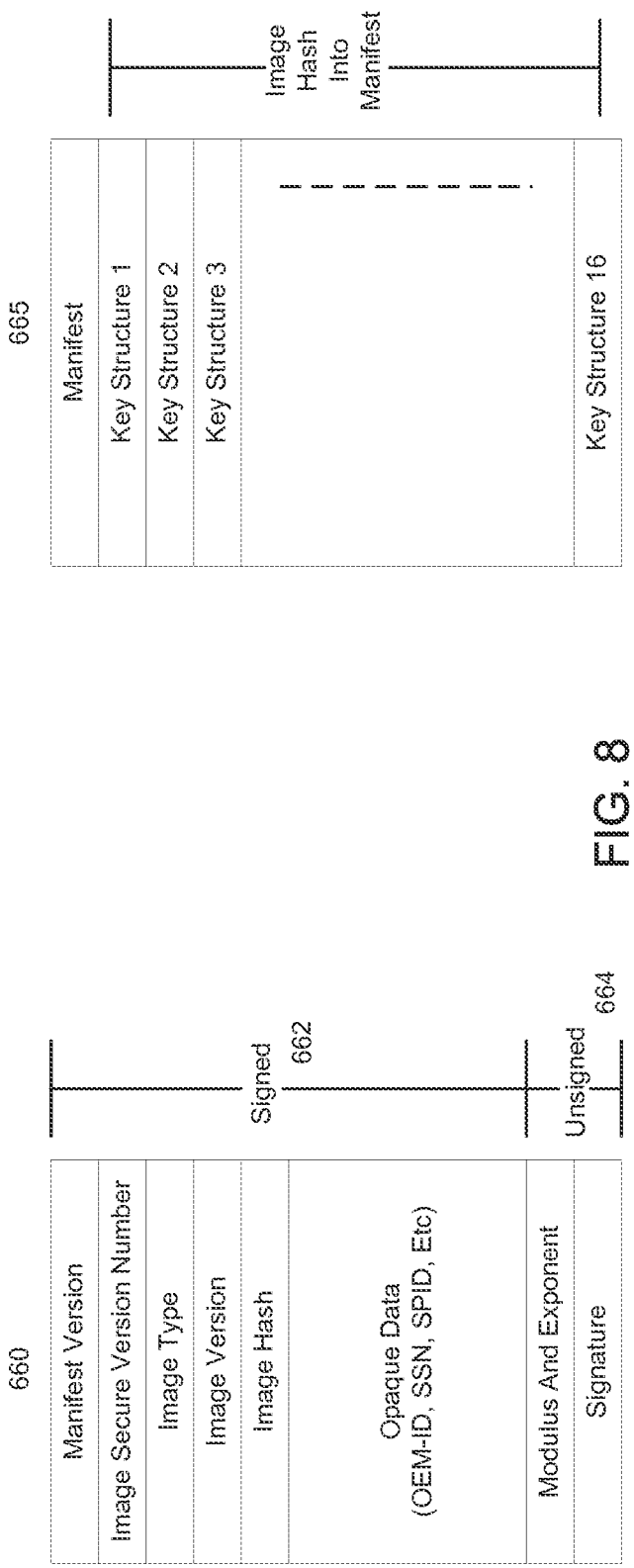
FIG. 8 is a block diagram of example manifests in accordance with an embodiment of the present invention.

Referring now to FIG. 8, shown is a block diagram of example manifests in accordance with an embodiment of the present invention. Specifically, FIG. 8 shows a first manifest 660 and a second manifest 665. In an embodiment, manifest 660 is a data structure or set of fields that is appended to every software or firmware image to be verified as described herein. Note that the order and size of the manifest fields may change in different examples. In the embodiment shown, information included in the manifest includes a signed portion 662 and an unsigned portion 664. Signed portion 662 includes, in one example, a manifest version, an image secure version number, an image type, an image version, an image hash, and opaque data. Although the scope of the present invention is not limited in this regard, in an embodiment this opaque data may include an OEM-ID and as other secure information such as a soft platform ID (SPID) or so forth. As also seen, unsigned portion 664 may include a modulus and exponent portion, and a signature, which in an embodiment may be a public key cryptology standard (PKCS) 1.5 RSA 2048 signature.

In turn, manifest 665 may be a RoT key manifest that includes a plurality of key structures, which may contain both a SoC provider and OEM keys. As an example, one or more of the keys may be a key hash, such as a 256 bit (b) key hash. Note that the software or firmware image is crypto hashed (e.g., using a SHA2 algorithm) and the hash is stored into the manifest. Although the scope of the present invention is not limited in this regard, in one embodiment 16 key structures may be provided in manifest 665. Each image has a security version number (SVN) which is a numerical assignment and prevents the platform from installing an image that bears an older SVN number. This SVN can be contained within the signed portion of the manifest, and prevents an older (possibly, vulnerable) image of the same software from being installed. The various manifests and key manifests are delivered to the platform together with additional software/firmware images. Each manifest contains a field of the OEM-ID, which should match with the OEM-ID contained on the SoC, before that image can be installed.

Figure 9:
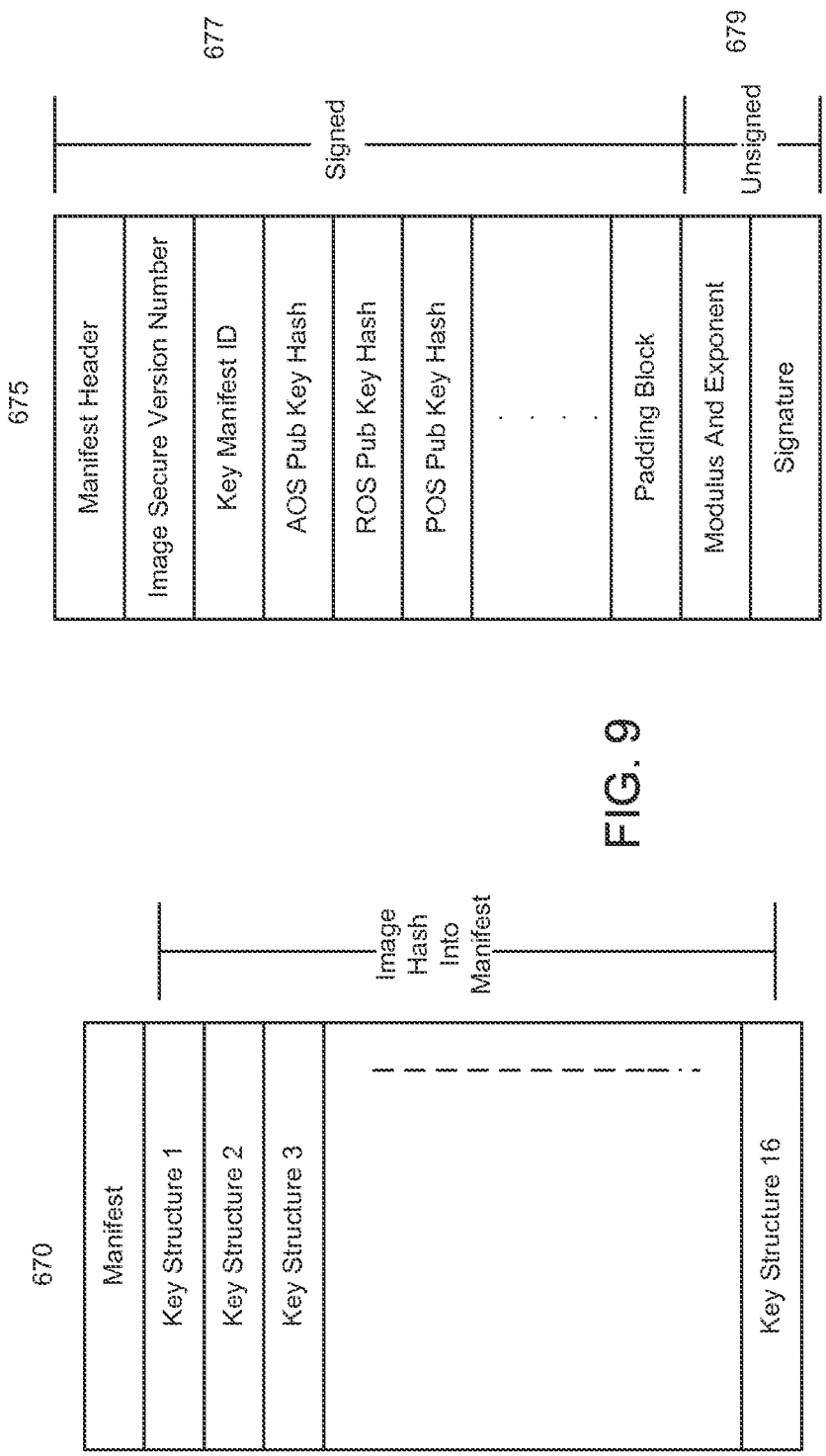
FIG. 9 is a block diagram of examples manifests in accordance with different embodiments.

Referring now to FIG. 9, shown is a block diagram example manifests in accordance with different embodiments. Manifest 670 is a first example of an OEM key manifest. As seen, this key manifest includes a plurality of the key structures. In one embodiment, at least one of the key structures may be a 256b key hash that has an image-type bit mask of 64b. Here, each bit corresponds to a firmware image type, such that setting a bit indicates the key to be used for signing that image. As one example, with a 64 bit mask, 32 bits may be reserved for different images and 32 bits reserved for image sub-types. This type of key manifest can be used for OEM key expansions based on the OEM views key. In addition, this key manifest enables different keys to be used for different images and provides for delegation/revocation of the keys with associated images.

Manifest 675 is another example of an OEM key manifest including a signed portion 677 and an unsigned portion 679. In the example shown, signed portion 677 includes a manifest header, an image secure version number, a key manifest ID, and a variety of public key hashes, including an Android OS (AOS) public key hash, a Recovery OS (ROS) public key hash and a Provisioning OS (POS) public key hash. Signed portion 677 may further include a padding block. As seen, unsigned portion includes a modulus and exponent portion and a signature portion, which may be a PKCS 1.5 RSA 2048 signature. Of course, understand while shown with these particular examples, many other manifests can be used in other embodiments.

Figure 10:
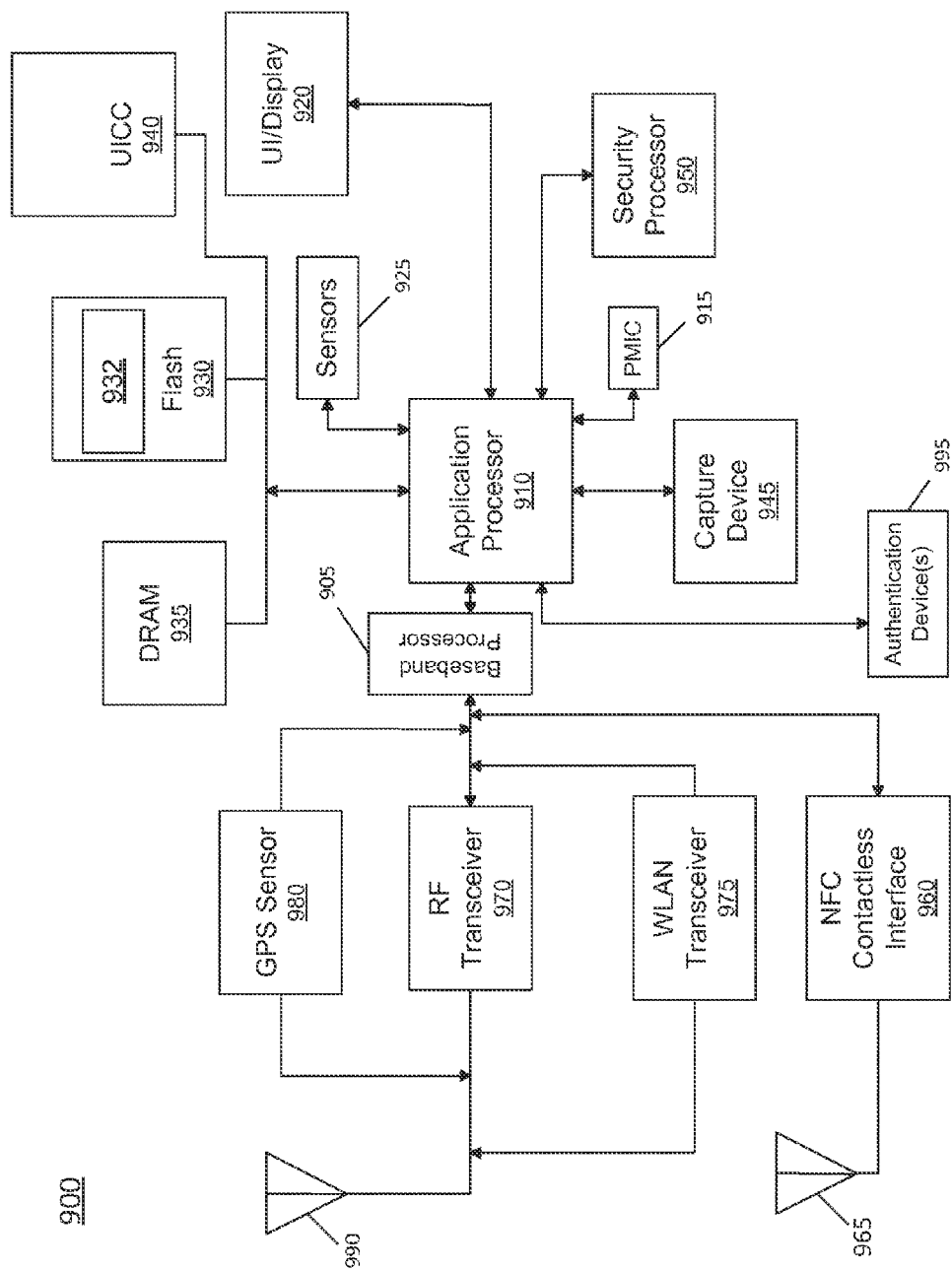
FIG. 10 is a block diagram of an example system with which embodiments can be used.

Embodiments may be implemented in an SoC or other processor for incorporation into a wide variety of platforms. Referring now to FIG. 10, shown is a block diagram of an example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. In the context of secure separation of software stack and/or IP assets, understand that application processor 910 may be an SoC including one or more non-volatile storages to store OEM and vendor keys and perform the firmware and other authentications described herein.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which a variety of OEM provisioned manifests (both of the OEM and third parties) may be stored. As further seen, application processor 910 also couples to a capture device 945 such as one or more image capture devices that can record video and/or still images.

Still referring to FIG. 10, a universal integrated circuit card (UICC) 940 comprises a subscriber identity module, which in some embodiments includes a secure storage to store secure user information. System 900 may further include a security processor 950 that may couple to application processor 910. In various embodiments, security processor 950 may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 10, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 11:
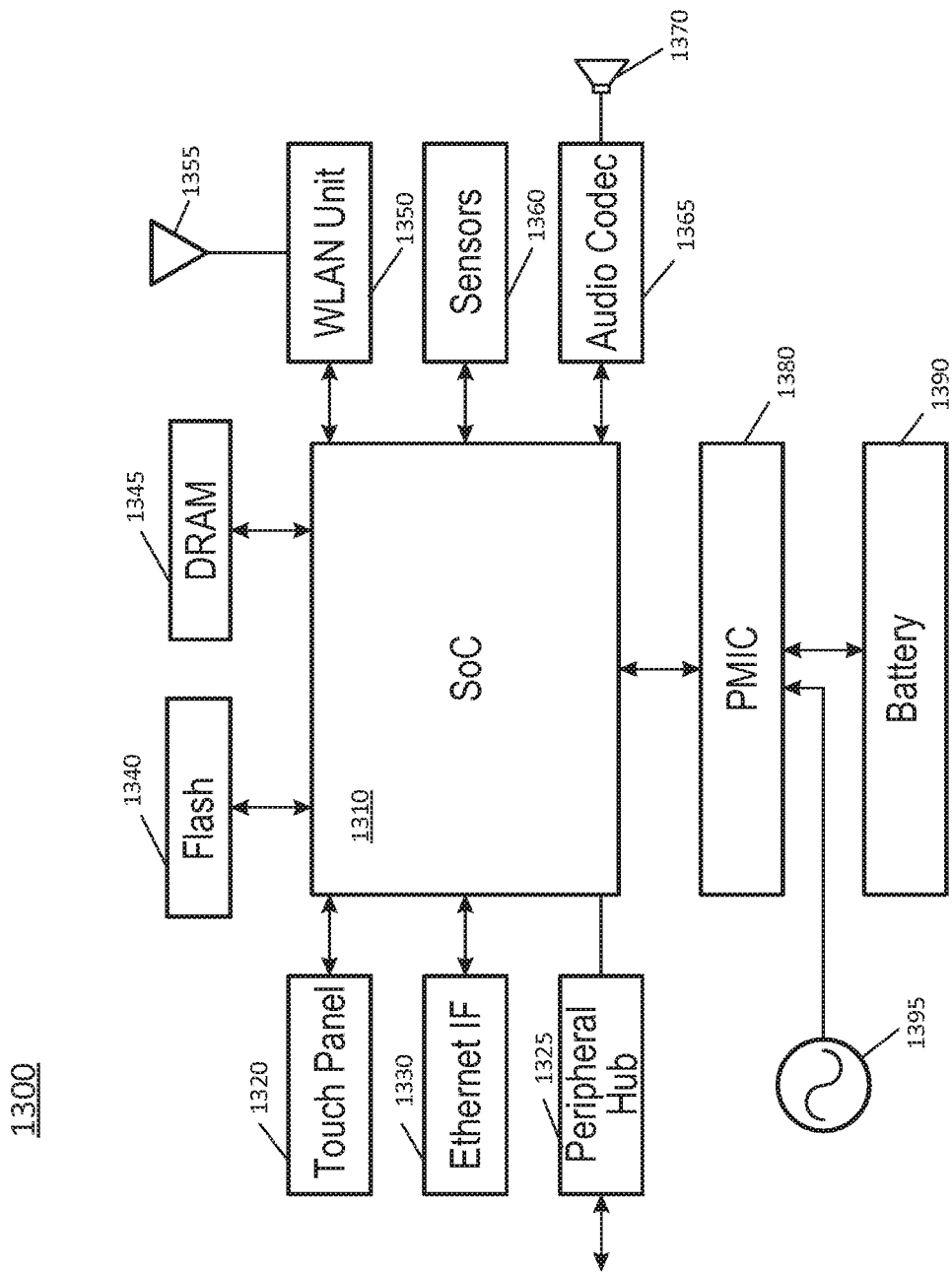
FIG. 11 is a block diagram of an example system with which embodiments may be used.

Referring now to FIG. 11, shown is a block diagram of an example system with which embodiments may be used. In the illustration of FIG. 11, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include hardware, software, and/or firmware as described herein to provide isolation of multi-tenant hardware of the SoC.

A variety of devices may couple to SoC 1310. In the illustration shown, a memory subsystem includes a flash memory 1340 (which may store a plurality of OEM provisioned manifests as described herein) and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 11, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 11, many variations and alternatives are possible.

Figure 12:
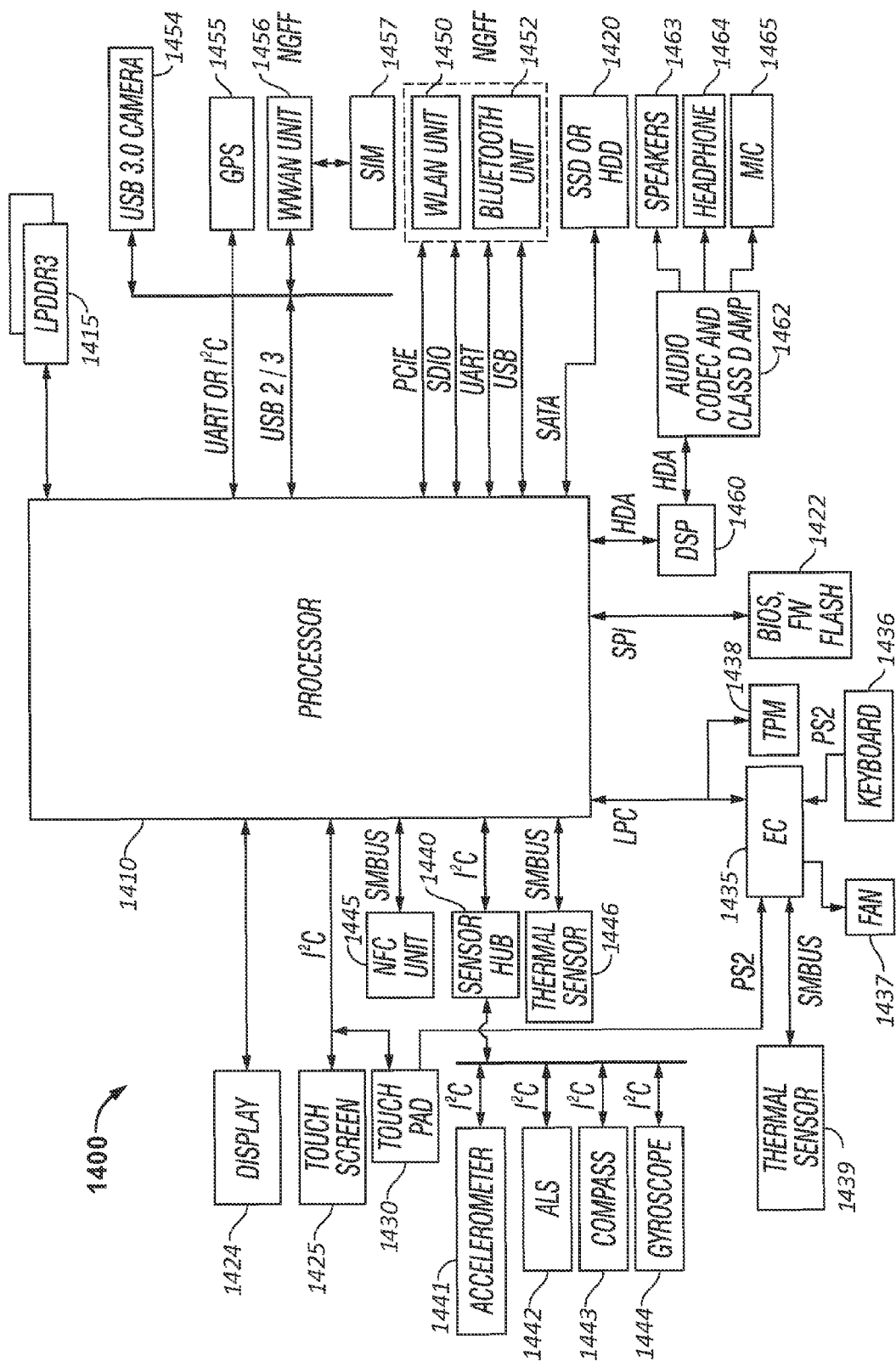
FIG. 12 is a block diagram of a representative computer system.

Referring now to FIG. 12, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include hardware, software, and/or firmware as described herein to isolate and authenticate firmware, applications, and/or IP assets.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1422 may be coupled to processor 1410, e.g., via a serial peripheral interface (SPI). This flash device may provide for non-volatile storage of system software, including a basic input/output software (BIOS) as well as other firmware of the system, which may be segmented into portions as described herein. Flash device 1422 also may store a set of manifests as described herein.

Various input/output (I/O) devices may be present within system 1400. Specifically shown in the embodiment of FIG. 12 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 12, in addition to touch screen 1425, user input by way of touch can also occur via a touch pad 1430 which may be configured within the chassis and may also be coupled to the same I2C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 12, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 12, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 12, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 12, WWAN unit 1456 and an integrated capture device such as a camera module 1454 may communicate via a given USB protocol such as a USB 2.0 or 3.0 link, or a UART or I2C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 12, understand the scope of the present invention is not limited in this regard.

Figure 13:
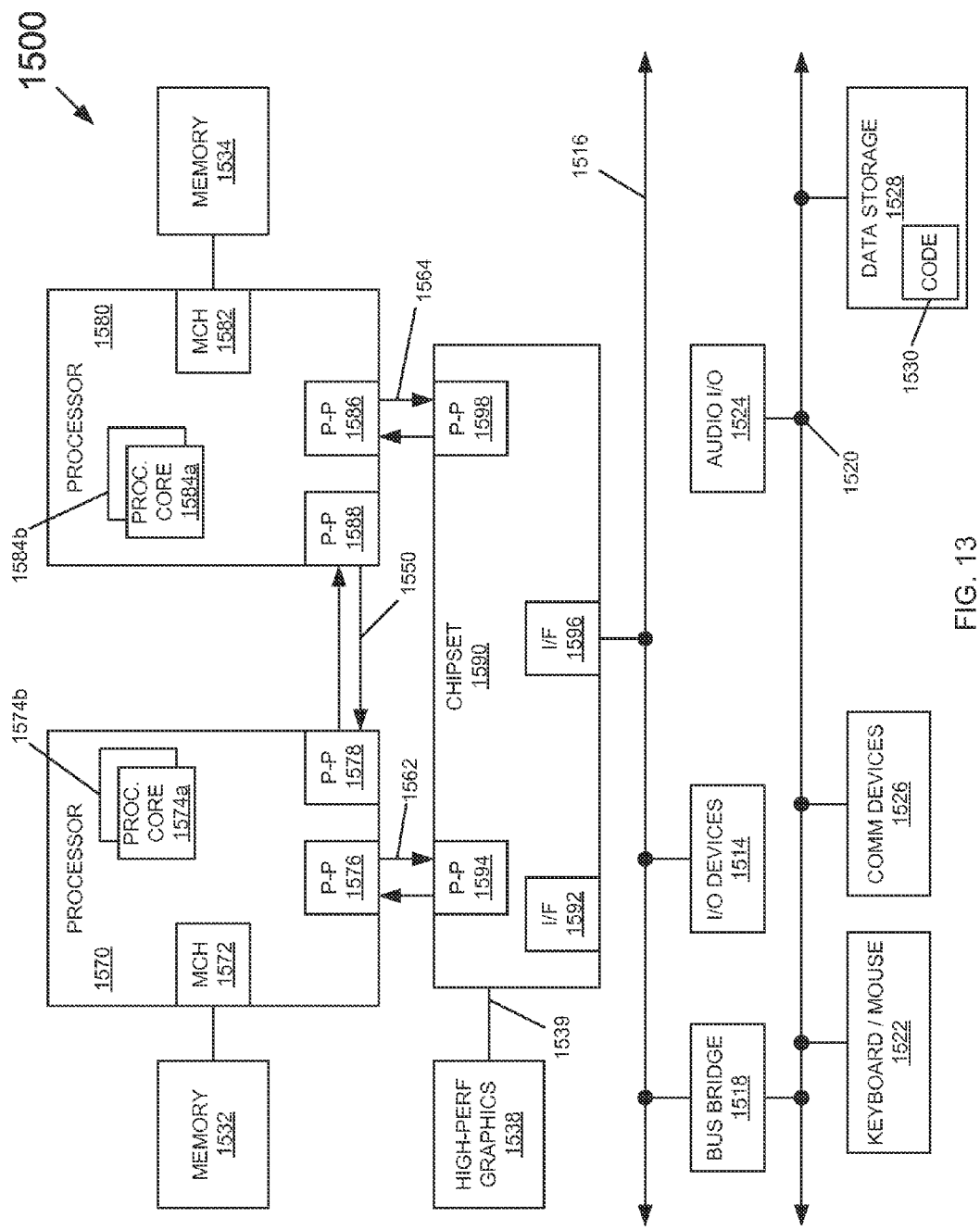
FIG. 13 is a block diagram of a system in accordance with an embodiment of the present invention.

Embodiments may be implemented in many different system types. Referring now to FIG. 13, shown is a block diagram of a system in accordance with an embodiment of the present invention. As shown in FIG. 13, multiprocessor system 1500 is a point-to-point interconnect system, and includes a first processor 1570 and a second processor 1580 coupled via a point-to-point interconnect 1550. As shown in FIG. 13, each of processors 1570 and 1580 may be multicore processors, including first and second processor cores (i.e., processor cores 1574a and 1574b and processor cores 1584a and 1584b), although potentially many more cores may be present in the processors. Each of the processors can include hardware and logic to perform the firmware verification and isolation techniques described herein.

Still referring to FIG. 13, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 13, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 13, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 13, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530 and one or more manifests, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, an apparatus comprises: at least one core to execute instructions; a security engine coupled to the at least one core; a ROM to store a first key associated with a vendor of the apparatus; and a fuse storage to store a second key associated with an OEM to include the apparatus in a platform, where a first portion of firmware of the platform is to be verified based at least in part on the first key and a second portion of firmware of the platform is to be verified based at least in part on the second key, the first portion of firmware associated with the vendor and the second portion of firmware associated with the OEM.

In Example 2, the security engine is to verify and execute the first portion of firmware and the at least one core is to execute the second portion of firmware.

In Example 3, the fuse storage is to be written with the second key during manufacture of the apparatus by the vendor of the apparatus, the apparatus comprising an SoC.

In Example 4, the first key optionally comprises a hash of a public key of the vendor.

In Example 5, the security engine and the first portion of firmware are to be inaccessible to the OEM or a third party.

In Example 6, the first portion of firmware and the second portion of firmware comprise a partitioned firmware for the platform.

In Example 7, the first portion of firmware is to verify a RoT manifest stored in a non-volatile storage of the platform, the RoT manifest signed by the second key, and responsive to verification of the RoT manifest, load the second portion of firmware, and use a third key stored in the RoT manifest to verify the second portion of firmware.

In Example 8, the fuse storage further is to store an OEM identifier.

In Example 9, the OEM identifier of Example 8 optionally is to bind the platform to the RoT manifest, the RoT manifest having a header including the OEM identifier.

In Example 10, a method comprises: loading a first portion of firmware into a memory of a system, the system including the memory and a SoC coupled to the memory, the first portion of firmware of a vendor of the SoC; verifying the first portion of firmware using a first key stored in a ROM of the SoC, the first key associated with the vendor; responsive to verifying the first portion of firmware, executing the first portion of firmware, including verifying a second portion of firmware using a second key, the second key obtained from a RoT manifest of the system, the second portion of firmware of a manufacturer of the system and the second key associated with the manufacturer; and executing the second portion of firmware responsive to verifying the second portion of firmware.

In Example 11, the method of Example 10 further comprises authenticating the RoT manifest with a third key, the third key obtained from a fuse storage of the SoC, the third key of the manufacturer and stored in the fuse storage by the vendor.

In Example 12, the verification of the second portion of firmware comprises comparing a hash of the second key with a hash of a fourth key stored in a header of the second portion of firmware.

In Example 13, the method of Example 12 further comprises verifying a third portion of firmware using a fifth key stored in the RoT manifest, where the verification of the third portion of firmware includes comparison of a hash of another key stored in the RoT manifest with a hash of a sixth key stored in a header of the third portion of firmware, and responsive to a miscomparison, accessing the fifth key and comparing a hash of the fifth key with the hash of the sixth key.

In Example 14, the method of Example 10 further comprises verifying an application of a third party to execute on the system using a third party key obtained from a third party key manifest of the system, the third party key and the third party key manifest associated with the third party.

In Example 15, the method of Example 10 further comprises booting an operating system from the second portion of firmware.

In Example 16, a machine-readable storage medium including machine-readable instructions, when executed, is to implement a method as claimed in any one of above Examples.

In Example 17, a system comprises: a processor having at least one core to execute instructions, a security engine coupled to the at least one core, a first storage to store a first immutable key associated with a vendor of the processor, and a second storage to store a second immutable key associated with an OEM of the system, where a first portion of firmware is to be verified based at least in part on the first immutable key and a second portion of firmware is to be verified based at least in part on the second immutable key, the first portion of firmware associated with the vendor and the second portion of firmware associated with the OEM; a system memory coupled to the processor; and a non-volatile storage coupled to the processor, the non-volatile storage to store a first RoT manifest associated with the OEM and including a plurality of keys, the plurality of keys including one or more first keys associated with the vendor and one or more second keys associated with the OEM.

In Example 18, the first portion of firmware optionally is provided by the vendor and the second portion of firmware is provided by the OEM, the first portion of firmware inaccessible to the OEM and the second portion of firmware inaccessible to the vendor.

In Example 19, the system of Example 17 further comprises a second manifest to be stored in the non-volatile storage, the second manifest to be dynamically stored in the non-volatile storage by the OEM or a delegate of the OEM.

In Example 20, the non-volatile storage is further to store a key manifest of the OEM, including a plurality of keys, the key manifest including a mask having a plurality of fields, each field to store an indicator to indicate a key of the plurality of keys to be used to verify a portion of firmware.

In Example 21, the security engine is to authenticate the RoT manifest with the second immutable key, where the RoT manifest is bound to the system with an identifier of the OEM.

In Example 22, an apparatus comprises: core means for executing instructions; security means coupled to the at least one core; ROM means for storing a first key associated with a vendor of the apparatus; and fuse storage means for storing a second key associated with an OEM to include the apparatus in a platform, where a first portion of firmware of the platform is to be verified based at least in part on the first key and a second portion of firmware of the platform is to be verified based at least in part on the second key, the first portion of firmware associated with the vendor and the second portion of firmware associated with the OEM.

In Example 23, the security means is optionally to verify and execute the first portion of firmware and the core means is optionally to execute the second portion of firmware.

In Example 24, the fuse storage means is optionally to be written with the second key during manufacture of the apparatus by the vendor of the apparatus, the apparatus comprising an SoC.

In Example 25, the first portion of firmware and the second portion of firmware comprise a partitioned firmware for the platform, the first portion of firmware to verify a RoT manifest stored in a non-volatile storage means of the platform, the RoT manifest signed by the second key, and responsive to verification of the RoT manifest, load the second portion of firmware, and use a third key stored in the RoT manifest to verify the second portion of firmware.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one core to execute instructions;
   a security engine coupled to the at least one core;
   a read only memory (ROM) to store a first key associated with a vendor of the apparatus; and
   a fuse storage to store a second key associated with an original equipment manufacturer (OEM) to include the apparatus in a platform, wherein a first portion of firmware of the platform is to be verified based at least in part on the first key and a second portion of firmware of the platform is to be verified based at least in part on the second key, the first portion of firmware associated with the vendor and the second portion of firmware associated with the OEM, wherein the first portion of firmware is to verify a root of trust (RoT) manifest stored in a non-volatile storage of the platform, the RoT manifest signed by the second key, and responsive to verification of the RoT manifest, load the second portion of firmware, and use a third key stored in the RoT manifest to verify the second portion of firmware.

2. The apparatus of claim 1, wherein the security engine is to verify and execute the first portion of firmware and the at least one core is to execute the second portion of firmware.

3. The apparatus of claim 1, wherein the fuse storage is to be written with the second key during manufacture of the apparatus by the vendor of the apparatus, the apparatus comprising an SoC.

4. The apparatus of claim 1, wherein the first key comprises a hash of a public key of the vendor.

5. The apparatus of claim 1, wherein the security engine and the first portion of firmware are to be inaccessible to the OEM or a third party.

6. The apparatus of claim 1, wherein the first portion of firmware and the second portion of firmware comprise a partitioned firmware for the platform.

7. The apparatus of claim 1, wherein the fuse storage further is to store an OEM identifier.

8. The apparatus of claim 7, wherein the OEM identifier is to bind the platform to the RoT manifest, the RoT manifest having a header including the OEM identifier.

9. At least one non-transitory computer readable storage medium comprising instructions that when executed enable a system to:
   load a first portion of firmware into a memory of the system, the system including the memory and a system on chip (SoC) coupled to the memory, the first portion of firmware of a vendor of the SoC;
   verify the first portion of firmware using a first key stored in a read only memory (ROM) of the SoC, the first key associated with the vendor;
   responsive to verification of the first portion of firmware, execute the first portion of firmware, including verification of a second portion of firmware using a second key, the second key obtained from a root of trust (RoT) manifest of the system, the second portion of firmware of a manufacturer of the system and the second key associated with the manufacturer, wherein the RoT manifest is to be authenticated with a third key, the third key obtained from a fuse storage of the SoC, the third key of the manufacturer and stored in the fuse storage by the vendor; and
   execute the second portion of firmware responsive to verification of the second portion of firmware.

10. The at least one non-transitory computer readable medium of claim 9, wherein the verification of the second portion of firmware comprises comparison of a hash of the second key with a hash of a fourth key stored in a header of the second portion of firmware.

11. The at least one non-transitory computer readable medium of claim 10, further comprising instructions that when executed enable the system to verify a third portion of firmware using a fifth key stored in the RoT manifest, wherein the verification of the third portion of firmware includes comparison of a hash of another key stored in the RoT manifest with a hash of a sixth key stored in a header of the third portion of firmware, and responsive to a miscomparison, to access the fifth key and compare a hash of the fifth key with the hash of the sixth key.

12. The at least one non-transitory computer readable medium of claim 9, further comprising instructions that when executed enable the system to verify an application of a third party to execute on the system using a third party key obtained from a third party key manifest of the system, the third party key and the third party key manifest associated with the third party.

13. The at least one non-transitory computer readable medium of claim 9, further comprising instructions that when executed enable the system to boot an operating system from the second portion of firmware.

14. A system comprising:
   a processor having at least one core to execute instructions, a security engine coupled to the at least one core, a first storage to store a first immutable key associated with a vendor of the processor, and a second storage to store a second immutable key associated with an original equipment manufacturer (OEM) of the system, wherein a first portion of firmware is to be verified based at least in part on the first immutable key and a second portion of firmware is to be verified based at least in part on the second immutable key, the first portion of firmware associated with the vendor and the second portion of firmware associated with the OEM;
   a system memory coupled to the processor; and
   a non-volatile storage coupled to the processor, the non-volatile storage to store a first root of trust (RoT) manifest associated with the OEM and including a plurality of keys, the plurality of keys including one or more first keys associated with the vendor and one or more second keys associated with the OEM.

15. The system of claim 14, wherein the first portion of firmware is provided by the vendor and the second portion of firmware is provided by the OEM, the first portion of firmware inaccessible to the OEM and the second portion of firmware inaccessible to the vendor.

16. The system of claim 14, further comprising a second manifest to be stored in the non-volatile storage, the second manifest to be dynamically stored in the non-volatile storage by the OEM or a delegate of the OEM.

17. The system of claim 14, wherein the non-volatile storage is further to store a key manifest of the OEM, including a plurality of keys, the key manifest including a mask having a plurality of fields, each field to store an indicator to indicate a key of the plurality of keys to be used to verify a portion of firmware.

18. The system of claim 14, wherein the security engine is to authenticate the RoT manifest with the second immutable key, wherein the RoT manifest is bound to the system with an identifier of the OEM.

* * * * *